(12) United States Patent
Muller et al.

(10) Patent No.: US 8,322,251 B2
(45) Date of Patent: Dec. 4, 2012

(54) TRANSMISSION ARRANGEMENT AND METHOD FOR LOAD EQUALIZATION IN A TRANSMISSION ARRANGEMENT

(75) Inventors: Bernd Muller, Friedrichshafen (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 690 days.

(21) Appl. No.: 12/538,909

(22) Filed: Aug. 11, 2009

(65) Prior Publication Data

US 2010/0071491 A1 Mar. 25, 2010

(30) Foreign Application Priority Data

Sep. 24, 2008 (DE) .................... 10 2008 042 320

(51) Int. Cl.
*F16H 37/06* (2006.01)
*F16H 3/44* (2006.01)
*B60W 10/00* (2006.01)

(52) U.S. Cl. ................ 74/665 F; 477/76; 475/302

(58) Field of Classification Search ........... 74/11–15.88, 74/335, 665 F, 665 G, 665 GA; 477/70–72, 477/76, 98; 475/302
See application file for complete search history.

(56) References Cited

U.S. PATENT DOCUMENTS

| 5,492,034 A * | 2/1996 | Bogema ................ 74/730.1 |
| 6,080,081 A | 6/2000 | Sauermann et al. |
| 6,779,416 B2 * | 8/2004 | Buri ........................ 74/331 |
| 7,976,431 B2 * | 7/2011 | Bader et al. ............ 477/109 |
| 8,116,951 B2 * | 2/2012 | Holmes .................... 701/51 |
| 2003/0121342 A1 | 7/2003 | Buri |
| 2006/0196286 A1 | 9/2006 | Regenscheit |
| 2008/0188349 A1 | 8/2008 | Romine |
| 2009/0071274 A1 * | 3/2009 | Bader et al. ............. 74/335 |
| 2009/0071277 A1 * | 3/2009 | Bader et al. .......... 74/336 R |
| 2009/0095101 A1 | 4/2009 | Gitt |
| 2009/0107289 A1 * | 4/2009 | Borntrager ............... 74/745 |
| 2009/0239704 A1 * | 9/2009 | Steinborn et al. .......... 477/4 |

FOREIGN PATENT DOCUMENTS

| DE | 37 39 898 A1 | 6/1989 |
| DE | 197 08 929 A1 | 9/1998 |
| DE | 100 21 761 A1 | 10/2001 |
| DE | 100 21 761 A1 | 12/2001 |
| DE | 103 30 159 A1 | 2/2005 |
| DE | 10 2005 025567 A1 | 12/2006 |
| DE | 10 2006 015661 A1 | 10/2007 |
| EP | 0 631 895 A | 1/1995 |

* cited by examiner

*Primary Examiner* — Troy Chambers
*Assistant Examiner* — Michael Gonzalez
(74) *Attorney, Agent, or Firm* — Davis & Bujold, PLLC

(57) ABSTRACT

A transmission arrangement (1) with at least two countershafts for a vehicle, in particular a utility vehicle is proposed, such that an auxiliary drive output (10) can be coupled by means of a torque-transmitting element (11) to a first countershaft (7), and such that a second countershaft (8) can be coupled with a transmission brake device (12) to bring about load equalization between the countershafts (7, 8) when the auxiliary output (10) is coupled to the first countershaft (7). In addition, a method is proposed for load equalization between the countershafts (7, 8) of a transfer transmission when an auxiliary output (10) is engaged, such that in a first shift position of a main group (2) of the transfer transmission, in which the second countershaft (8), not coupled to the auxiliary output (10), is free from load, a load torque is applied to the second countershaft (8) for load equalization.

6 Claims, 1 Drawing Sheet

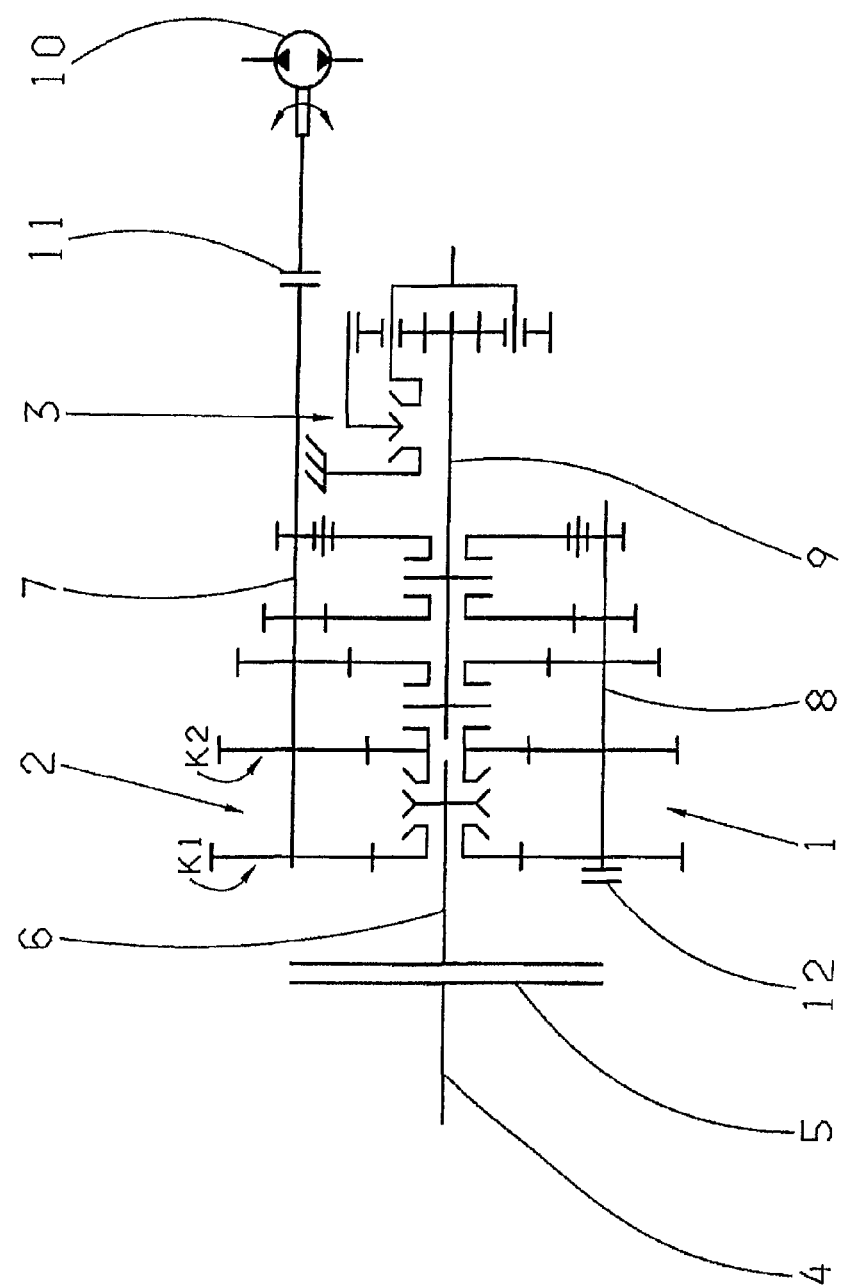

TRANSMISSION ARRANGEMENT AND METHOD FOR LOAD EQUALIZATION IN A TRANSMISSION ARRANGEMENT

This application claims priority from German patent application serial no. 10 2008 042 320.3 filed Sep. 24, 2008.

FIELD OF THE INVENTION

The present invention concerns a transmission arrangement with at least two countershafts for a vehicle. Furthermore, the invention concerns a method for load equalization in a range-change transmission.

BACKGROUND OF THE INVENTION

From automotive technology, transfer transmissions of countershaft design are known, which are used as transmission arrangements for utility motor vehicles. Usually, in such transmission arrangements the auxiliary drive output is coupled to one of the countershafts by means of a clutch. In a transfer transmission with two countershafts, owing to the non-uniform torque distribution on the countershafts the auxiliary drive output can only be used in a particular position of the main transmission group. This restricts the number of gears available during the operation of the auxiliary output. Moreover, no gearshifts are possible while the auxiliary output is activated. In addition, the auxiliary output cannot be coupled or engaged, or decoupled or disengaged, while driving.

Known from the document 100 21 761 A1 is a shifting device for a transmission with load distribution to two countershafts with two constant gear-trains. At least one constant serves to transmit torque in the transmission to whichever countershaft is associated with an auxiliary output. The shifting device also comprises a synchronization device. The constants comprise three gearwheels, two of which are arranged on the countershafts while the third gearwheel in arranged on the input shaft or the main shaft of the transmission, axially fixed but able to move radially. The gearwheel of the second constant not arranged on one of the countershafts is fixed in the radial direction in a coupling device, in such manner that the coupling device allows radial play of the gearwheel relative to the shaft on which the gearwheel is arranged. A clutch is provided between the synchronization device and the gearwheel of the second constant not arranged on one of the countershafts. When the torque transmitted by the transmission input shaft to the transmission is transferred, via the shifting device, to the gearwheel of the second constant not mounted on one of the countershafts, then the two tooth flanks of the respectively engaged teeth bear on the tooth flanks of the corresponding meshing gearwheels on the countershafts. Due to the radial fixing of the gearwheel of the second constant in the coupling device, the gearwheel can no longer be displaced radially. The gearwheel of the first constant not arranged on the countershafts, by virtue of its radial mounting, forms a coupling element between the two countershafts and thereby produces a form-interlocked back-coupling of the countershaft to which the auxiliary output is coupled, to the opposite and previously not loaded countershaft. As a result of this back-coupling, the tooth forces of the gearwheel of the second constant are distributed in equal measure to both countershafts and returned again, via the first constant, to the countershaft to which the auxiliary output is connected.

The known shifting device, however, has the serious disadvantage that numerous additional components are required in order to produce the shifting mechanism for load distribution to the main transmission group.

SUMMARY OF THE INVENTION

The purpose of the present invention is to propose a transmission arrangement and a method of the type described at the start, with which load equalization during the operation of the auxiliary output can be achieved in the simplest possible way without the need for additional components.

The set objective of the invention can be achieved with a transmission arrangement with at least two countershafts for a vehicle, in particular a utility vehicle, such that an auxiliary drive output can be coupled, via a torque-transmitting element, to a first countershaft and such that a second countershaft can be coupled with a transmission brake device to achieve load equalization between the countershafts when the auxiliary output is coupled to the first countershaft.

Due to the fact that in the transmission arrangement proposed according to the invention a transmission brake device, for example one that is already present, is used on the load-free countershaft not connected to the auxiliary output, load equalization can be produced between the two countershafts so that the auxiliary output can be used in both positions of the transfer transmission. Thanks to the arrangement according to the invention of components already present, the disadvantages of the prior art mentioned earlier are eliminated in the simplest manner without the need for additional components or structural elements.

A disk brake, a disk clutch, a hydraulic clutch or suchlike can be used as the transmission brake device and torque-transmitting element for coupling the auxiliary output. It is also possible to use, for example as the torque-transmitting element, a claw clutch or some other type of form-interlocking transmission element.

The torque-transmitting element and the transmission brake device can preferably be fluid-actuated or even electro-magnetically actuated. However, other actuation methods are also conceivable.

With the proposed transmission arrangement the load equalization can preferably be implemented by slipping operation when, for example, frictional elements are used as the torque-transmitting element and/or the transmission brake device. In slipping operation a corresponding amount of heat is generated, but in a further development of the invention this can be counteracted by designing the torque-transmitting element and the transmission brake device in an appropriately durable way.

The transmission arrangement according to the invention can preferably be used, for example, for a 12-gear transfer transmission with two countershafts. Other fields of application are also conceivable.

The set objective of the invention is also achieved by a method for load equalization between the countershafts of a transfer transmission with an activated or coupled auxiliary output, such that in a first shift position of a main group of the transfer transmission in which the countershaft not coupled to the auxiliary output is not under load, a load torque is applied to the load-free countershaft in order to equalize the load between the countershafts.

In this way, with the proposed method uniform torque distribution is produced between the countershafts during the operation of the auxiliary output, regardless of the shift position of the main group.

For example, when a frictional torque-transmitting element and a frictional transmission brake device are used, according to a preferred embodiment of the invention it can be provided that the frictional transmission brake device on the load-free countershaft and the frictional torque-transmitting element for coupling the auxiliary output are operated in a slipping condition.

To bring about the slipping operation, force control is preferably used. Depending on the way in which the transmission brake device and the torque-transmitting element are actuated, by means of this force regulation or force control an appropriate pressure in the case of fluid-actuated elements or an appropriate current in the case of electromagnetically actuated elements can be set in order to produce slipping operation.

As already mentioned, the heat generated during slipping operation can be counteracted, so far as the arrangement is concerned, by appropriate design of the frictional elements. However, the heat generated can also be limited by adapting the method appropriately. For example, if a temperature limit is recognized in the torque-transmifting element and/or the transmission brake device, a disengagement or decoupling can be carried out. After the decoupling of the auxiliary output and the transmission brake device, the main group can for example be shifted so that thereafter the auxiliary output can be operated without using the transmission brake device. Then for example, as soon as the transmission brake device and the torque-transmitting element have cooled down, the main group can be shifted back again.

BRIEF DESCRIPTION OF THE DRAWINGS

Below, the invention is explained in more detail with reference to the drawing. The single figure illustrating the invention shows a schematic representation of a transmission arrangement according to the invention, in which for example the proposed method can be used. However, other possible uses can also be envisaged.

DETAILED DESCRIPTION OF THE PREFERRED EMBODIMENTS

As an example, the figure shows a transfer transmission 1 with a main group 2 and a range-change group 3. The main group has two shift positions, in the first of which the first constant gear-train K1 and in the second of which the second constant gear-train K2 is active. The range-change group 3 is a planetary transmission associated with the transmission output shaft 9.

The transfer transmission 1 is powered by an engine driveshaft 4 which is coupled by means of a driving clutch 5 to a transmission input shaft 6 for driving the vehicle. In addition, the transfer transmission 1 comprises a first countershaft 7 and a second countershaft 8 on which are mounted gearwheels for producing various transmission ratios for forward and reverse gears.

The first countershaft 7 is associated with an auxiliary drive output 10. The auxiliary output 10 can be coupled by a torque-transmitting element 11 to the countershaft 7. To achieve load equalization the second countershaft 8 is associated with a transmission brake device 12. In this way, when the auxiliary output 10 is activated or coupled, a corresponding load torque can be applied to the second countershaft 8 so that an equal torque distribution is produced on both countershafts 7, 8. Consequently, and because of this load equalization, transmission shifts can be carried out even while the auxiliary output 10 is activated. Furthermore, even while driving, the auxiliary output 10 can be engaged or coupled, or disengaged or decoupled. Moreover, there is no transmission ratio restriction during the process of the auxiliary output 10.

Preferably, a disk brake can be used as the transmission brake device 12 and a claw clutch as the torque-transmitting element 11 for coupling the auxiliary output 10 to the first countershaft 7. It is also possible to use a disk clutch or a hydraulic clutch as the torque-transmitting element 11. Likewise, a disk clutch or a hydraulic clutch can be used as the transmission brake device 12.

When form-interlocking elements are used, the torques, given by the contact pressure force multiplied by the lever arm and the coefficient of friction, can be almost the same so that load equalization between the countershafts 7 and 8 is achieved.

Indexes
1 Transmission arrangement
2 Main transmission group
3 Range-change group
4 Engine driveshaft
5 Driving clutch
6 Transmission input shaft
7 First countershaft
8 Second countershaft
9 Transmission output shaft
10 Auxiliary drive output
11 Torque-transmitting element
12 Transmission brake device

The invention claimed is:

1. A method for load equalization between a first countershaft (7) and a second countershaft (8) of a transfer transmission when an auxiliary drive output (10) is engaged and coupled to the first countershaft (7), the method comprising the steps of:
when a main group (2) of the transfer transmission is in a first shift position, and the second countershaft (8), not coupled to the auxiliary output (10), is unloaded, applying a load torque to the second countershaft (8) so as to facilitate load equalization between the first and the second countershafts (7, 8).

2. The method according to claim 1, wherein applying the load torque to the second countershaft (8) comprises the steps of operating a frictional transmission brake device (12), on the second countershaft (8), in a slipping operation mode and also operating a frictional torque-transmitting element (11), on the first countershaft (7), in a slipping operation mode.

3. The method according to claims 2, further comprising the step of, after decoupling the auxiliary output (10) and the transmission brake device (12), shifting the main group (2) so that, after re-coupling, the auxiliary output (10) is operated with substantially without any slip.

4. The method according to claim 2, further comprising the step of producing the slipping operation mode with a force control.

5. The method according to claim 2, further comprising the step of limiting heat generated during the slipping operation mode.

6. The method according to claim 5, further comprising the step of, if a temperature limit is recognized in at least one of the torque-transmitting element (11) and the transmission brake device (12), decoupling at least one of the auxiliary drive output (10), from the first countershaft (7), and the transmission brake device (12), from the second countershaft (8).

* * * * *